Dec. 4, 1951 R. ZANIROLI 2,577,441
HEATING AND DRYING SYSTEM
Filed Jan. 7, 1948 4 Sheets-Sheet 1
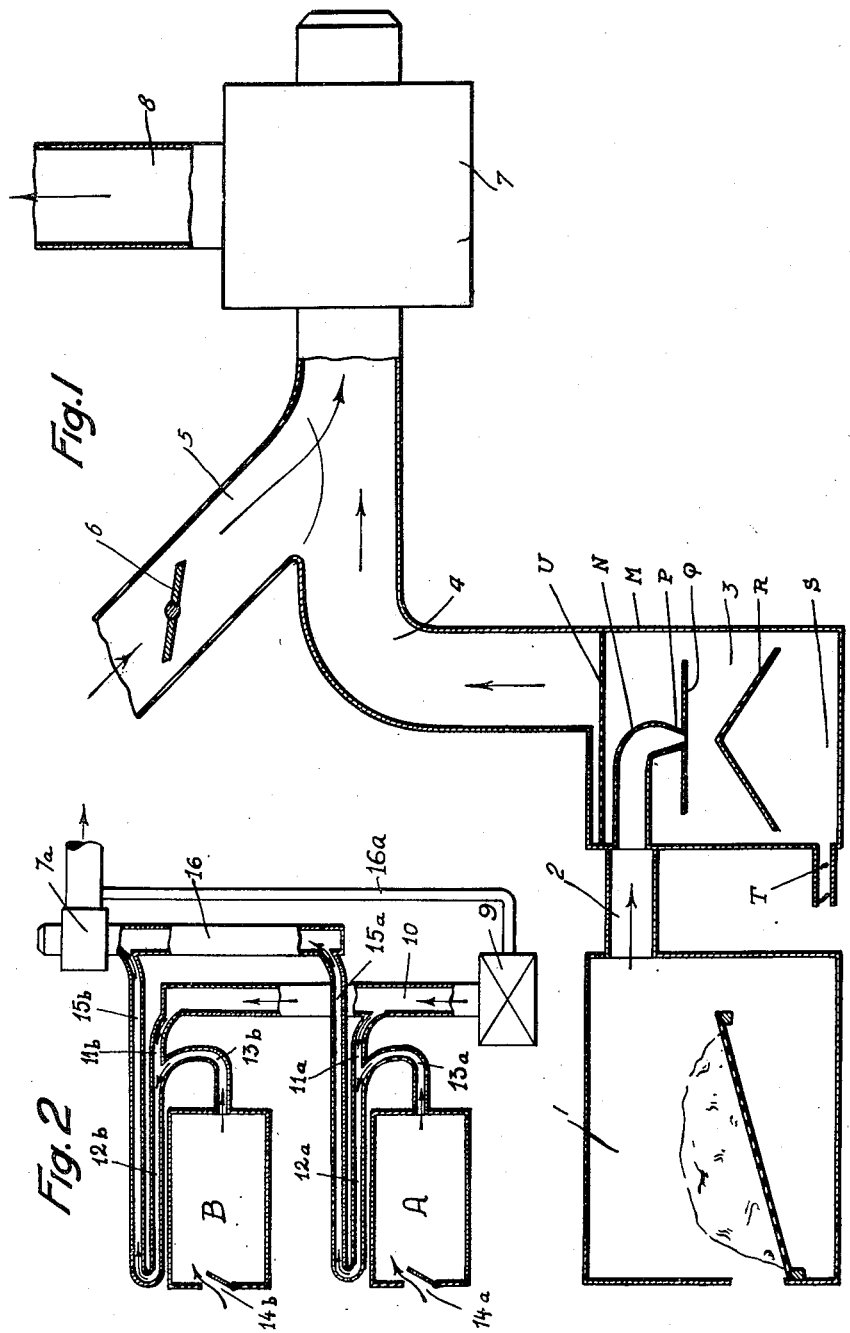

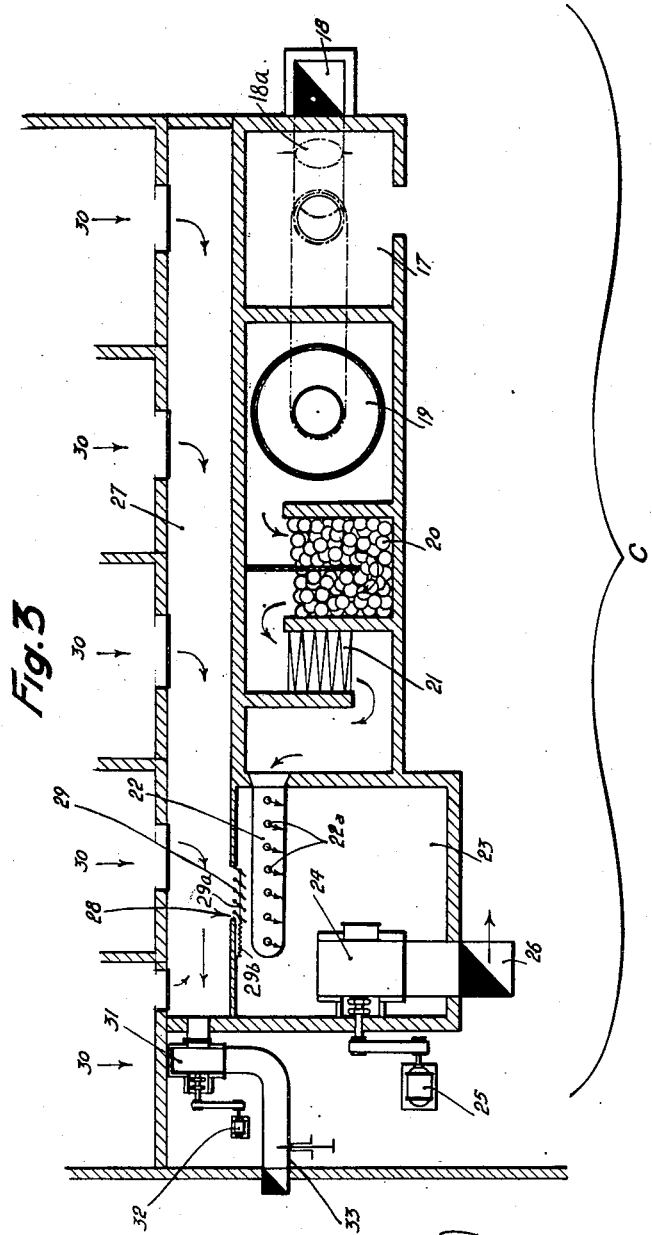

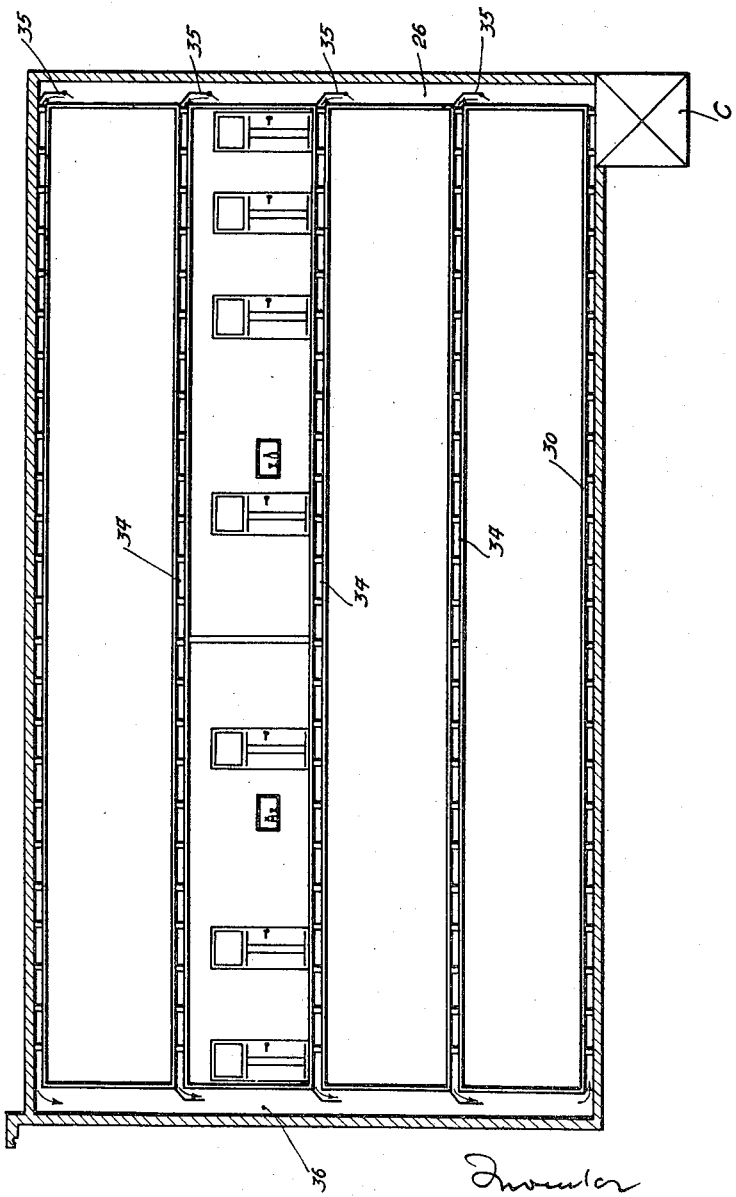

Dec. 4, 1951  R. ZANIROLI  2,577,441
HEATING AND DRYING SYSTEM
Filed Jan. 7, 1948  4 Sheets—Sheet 4

Patented Dec. 4, 1951

2,577,441

UNITED STATES PATENT OFFICE 2,577,441

HEATING AND DRYING SYSTEM

René Zaniroli, Paris, France

Application January 7, 1948, Serial No. 1,042
In France January 9, 1947

3 Claims. (Cl. 237—69)

The present invention relates to the applying of combustion gases for drying and heating purposes in order to permit the direct use of said gases for said purposes.

Up to now it was not possible to make direct use of gases of combustion for the above mentioned operations since said gases invariably contain solid particles or dust that tend to the rapid choking of the ducts and the plugging up of the pores of the materials to be dried and there is always a risk of fire hazard. The high temperature of said gases also risks damage to the materials exposed to the direct action of the combustion gases.

Further experiences show that the heating of premises is more pleasant when use is made of heat exchangers that have a great surface and wherein the heating medium is at moderate temperature.

One object of the present invention is to provide drying and heating operations by means of combustion gases, by freeing the combustion gases of their dust and by then mixing the cleaned hot gases with a relatively cold gas which may be either fresh air or heating gases having already given up their heat during a previous drying or heating cycle and being thus relatively cold.

Another object of the invention is to provide for the use of heating gases at moderate temperature for the heating of premises by means of heat exchangers having a large surface constituted by hollow walls, partitions, ceiling or floor wherein pass the circulating gases.

An arrangement for producing heating gas and two heating plants for premises are illustrated in the accompanying diagrammatic drawings that are given as example only. In said drawings:

Fig. 1 shows an arrangement for producing gas for heating or drying;

Fig. 2 illustrates a heating plant in which the arrangement of Fig. 1 is put into practice;

Fig. 3 is a plan view of the firing system of a heating plant;

Fig. 4 is a vertical section of a building heated by a plant according to the invention and including the heating system illustrated in Fig. 3;

Figure 5:
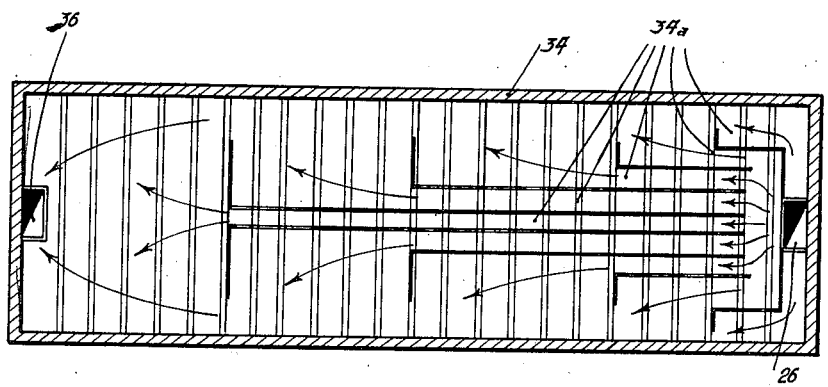
Fig. 5 is a horizontal section of a heating ceiling (or floor) with its means of distribution of the heating gases.

In Fig. 1, I denotes a combustion chamber from where the burnt gases, with a varying content of dust, pass through a pipe 2 into a dynamic dust-remover 3.

The dust-remover 3 comprises a casing M in the upper part of which is arranged an elbow N connected with the pipe 2.

The elbow N ends in a conical nozzle P to the outer edge of which a baffle-plate Q, is attached.

Beneath the opening of the nozzle P is arranged a cone-shaped deflector R the vertex of which is arranged substantially at the vertex of the conical nozzle N. The lower edge of the deflecting cone R is arranged at a short distance from the inner vertical wall of the casing M, said cone forming with the lower portion of said casing M, a collecting chamber S for dust particles which can be withdrawn through a pipe T.

In the upper portion of the casing, above the elbow N, is arranged a safety filter U on the downstream side of which is located the outlet pipe 4 for the dust-free gases.

After leaving the dust-remover 3, the dust-free gases travel along the pipe 4, to which is connected an inlet 5 for fresh air controlled by a throttle valve or baffle 6 and pass to a blower 7, delivering the gases into a pipe 8.

The baffle 6 may be put under the control of a thermostat arranged in the heating or drying zone, so that the mixture of hot combustion gases and fresh air may enter into this zone at a substantially steady and adjustable temperature. This mixture of gas and air, which will be called for the sake of brevity "heating gas mixture" is free from dust.

Standard dryers comprise, as a rule, means for heating by radiation which involve a large layout in pipes and are therefore quite elaborate and expensive.

Such dryers may, in accordance with the invention, be heated directly by the heating gas mixture, which is free of dust. The heating gas mixture may be used for drying wood, prefabricated elements of concrete or cement, such as columns, chimney shafts, girders, pipes.

In one particular form of operation of the invention, the heating gas mixture may circulate partly in a closed circuit; that is to say that a portion of the gas mixture leaving the dryer may be sent to a mixing chamber where it is mixed with the combustion gases as more fully described hereinafter.

In the embodiment of a heating plant for premises shown in Fig. 2, reference numeral 9 indicates an arrangement for producing dust-free combustion gases, which arrangement comprises, for instance, the component parts 1, 2 and 3 of Fig. 1. A main distributor pipe 10 starts off from the arrangement 9 and is provided with a plurality of by-passes or branch pipes 11a, 11b, the number of which equals that of the premises A, B to be heated. Each by-pass or branch pipe 11a, 11b, is connected to a heat exchanger 12a, 12b for the heating of the corresponding premises A, B, and to an air inlet pipe 13a, 13b, leading from the premises A, B which are provided with an adjustable ventilation opening 14a, 14b. Each heat exchanger 12a, 12b, is connected to an outlet pipe 15a, 15b, joined to a collecting pipe 16 leading to a blower 7a which sucks the gases leaving the heat exchangers and then delivers them to the free air or else partly to the inlet of the device 9 by means of a return pipe 16a, the plant thus operating partly in closed circuit.

The heat exchangers may either be arranged in the actual premises, or may be embodied structurally in the walls, partitions, floors and the like thereof. With the heating gases in a dust-free condition, there will be no choking of pipes or danger of fire such as might happen in the event of a collection of dust which might burst into flames at a given temperature of the heating gas mixtures. The invention may thus be adapted to the construction of heating plants for the heating of premises provided with radiating surfaces of large areas such as floors, ceilings, walls, which are at a low temperature.

The new method of heating has a still further advantage since the combustion gases have a high temperature and inlet mains need therefore only be of small cross section, while the mixture with fresh air (or other gas) takes place under the best conditions at the inlet of the heat exchanger of each of the premises.

Figure 6:
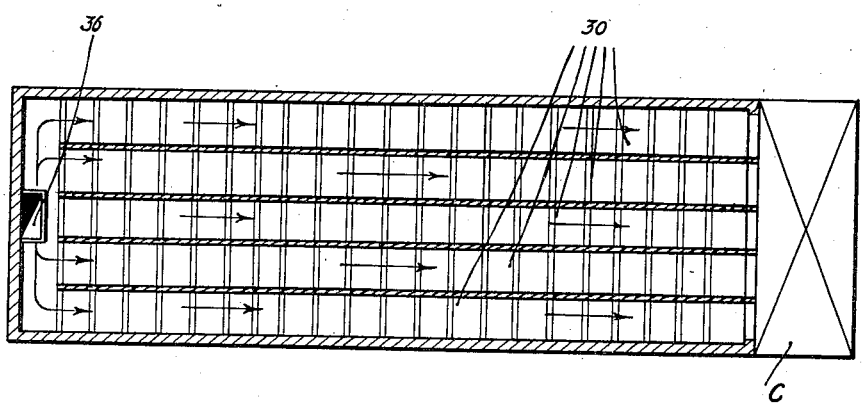
Fig. 6 is a horizontal section of the heating floor through which is carried out the return of the heating gases recovered in the heating system.

In the heating plant shown in Figs. 3 to 6, the heating unit C comprises (see Fig. 3) a furnace 17 connected on the one hand, to a stack 18 from which it may be isolated after the plant has been started by a damper 18a and, on the other hand, to a static dust-remover 19 connected to a primary scrubber 20 and a secondary scrubber 21 from where the combustion gases having a high temperature are led to a distributor 22 provided with openings 22a and extending into a mixing chamber 23.

A blower 24, arranged in the mixing chamber 23 and driven by an external motor 25, sucks the mixture into the chamber 23 and discharges the same into a distributing main 26.

The mixing chamber 23 is in communication with a main 27 through an aperture 28 provided with one-way control means such as a gas valve 29 allowing the gas fluid to travel only in the direction from the main 27 to chamber 23 and to prevent the fluid from travelling in the opposite direction. The gas valve 29 may, for instance, include a plurality of movable shutters 29a subjected to the action of a light return spring 29b which urges the shutters 29a into their closing position.

The return pipes 30 of the heating circuit are preferably constituted by gas passages built into a floor of the building connected to the main 27, and adapted to form one or more heat exchangers with large radiating surfaces.

At one end of the main 27 is arranged a suction fan 31 driven by an electric motor 32 and which discharges into the atmosphere, the delivery of fan 31 being controlled by an adjustable damper 33 or by an adjustable throttle.

The main 26 starts from the heating unit C and leads the heating gas mixture to one end of the heat exchangers with large radiating surfaces formed by the heating ceilings and floors 34 which are fitted to allow the most efficient circulation of the heating fluid.

At the inlet of each heat exchanger 34 is arranged an adjustable member 35 for controlling the flow of gases entering the heat exchanger 34. The adjustment of the member 35 may be made by hand or automatically by means of thermostats (not shown). The various portions of each heat exchanger may be substantially the same, if the exchanger 34 is provided with distributing pipes 34a which may be controlled by adjustable throttles (not shown).

The other end of each heat exchanger 34 is connected to a collecting return pipe 36 which is in turn connected to one or more return pipes 30 fitted in the heating floor for the lowest floor or ground floor, while these pipes emerge, as seen above, in the large collecting pipe 27 of the heating unit C.

This heating plant operates as follows:

When the furnace or fire box has to be lighted, the latter is connected with the stack 18. When the furnace is properly operating, it is cut off from the stack by closing the damper 18a and the blower 24 and suction fan 31 are started.

The cleaned combustion gases at high temperature are sucked under the combined action of the blower 24 and the fan 31 into the heating system, where they circulate in an almost closed circuit under the action of the blower 24, the circuit being kept at low pressure through the suction fan 31 of which the delivery into the atmosphere ensures an immediate adjustment of the rate of running of the furnace 17, since the amount of combustive air let into the furnace is a direct function of the amount of the gas portion entering the main 27 and transferred through the suction fan 31 into the atmosphere.

The following points have to be remarked in the described plant:

(a) The entire heating circuit, including the heat exchangers, is kept at a low pressure, thus avoiding any danger of gas poisoning for people living on the premises in the event of a leakage in the circuit;

(b) The gases dicharged into the atmosphere by the suction fan 31 have passed through the heating circuit and thus are relatively cold;

(c) The gases which have passed through the heating circuit and are recovered in the chamber 23 are mixed with combustion gases having a high temperature so as to form a mixture of heating gases having a medium temperature suitable for the heat exchangers with a large radiating surface.

(d) The recovered part of the heating gases at the discharge end of the heat exchangers is a substantial addition increasing the general efficiency of the heating plant.

What I claim is:

1. An arrangement for heating premises, comprising in combination, means for producing hot dust-free combustion gases; a main distributing duct connected to said producing means; at least one branch pipe for each premise to be heated connected to said main distributing duct; a pipe adapted to suck fresh air opening into each of the premises to be heated and leading into said branch pipe; at least one heat exchanger in each of the premises to be heated having an input side connected with said branch pipe on the down stream side of the point at which said sucking pipe opens into said branch pipe, so that the said heat exchanger is fed with a mixture of hot combustion gases and fresh air; a main collecting duct; a pipe for connecting said collecting duct with the output of each heat exchanger; and suction means having an input side connected with said main collecting duct.

2. An arrangement for heating premises, comprising in combination, means for producing hot dust-free combustion gases; a mixing chamber connected with the output of said combustion gas producing means; circulating means for producing the circulation of a gaseous fluid having an input connected with said mixing chamber; a main distributing duct connected with the output of said circulating means; branch pipes leading off said distributing duct; means for adjusting the cross sectional area of said branch pipes; heat exchangers for the premises to be heated having an input side connected with said branch pipes, respectively; a collecting duct connected with the output side of said heat exchangers; a collecting chamber connected to said collecting duct; means for connecting said collecting chamber with said mixing chamber; a valve inserted in said connecting means and adapted to allow the passage of a gaseous fluid only in the direction leading from said collecting chamber to said mixing chamber; suction means connected with said collecting chamber, said suction means being in communication with the atmosphere and adapted to deliver into the atmosphere a part of the gases in said collecting chamber; and means for controlling the delivery of said suction means.

3. An arrangement for heating premises, comprising in combination, means for producing hot dust-free combustion gases; a mixing chamber connected with the output of said combustion gas producing means; circulating means for producing the circulation of a gaseous fluid having an input connected with said mixing chamber; a main distributing duct connected with the output of said circulating means; branch pipes leading off said distributing duct; heat exchangers for the premises to be heated having an input side connected with said branch pipes, respectively; a collecting duct connected with the output side of said heat exchangers; a collecting chamber connected to said collecting duct; means for connecting said collecting chamber with said mixing chamber; a valve inserted in said connecting means and adapted to allow the passage of a gaseous fluid only in the direction leading from said collecting chamber to said mixing chamber; suction means connected with said collecting chamber, said suction means being in communication with the atmosphere and adapted to deliver into the atmosphere a part of the gases in said collecting chamber; and means for controlling the delivery of said suction means.

RENÉ ZANIROLI.

REFERENCES CITED

The following references are of record in the file of this patent:

UNITED STATES PATENTS

| Number | Name | Date |
| --- | --- | --- |
| 408,285 | Boehning | Aug. 6, 1889 |
| 510,491 | Stripe | Dec. 12, 1893 |
| 1,147,463 | Ulrici | July 20, 1915 |
| 1,365,807 | Weber | Jan. 18, 1921 |
| 1,596,143 | Bisch | Aug. 17, 1926 |
| 1,765,916 | Haber | June 24, 1930 |
| 1,970,766 | Pfahl | Aug. 21, 1934 |
| 2,331,875 | Zandt | Oct. 19, 1943 |

FOREIGN PATENTS

| Number | Country | Date |
| --- | --- | --- |
| 10,274 | Great Britain | 1911 |
| 357,980 | Italy | Apr. 2, 1938 |
| 478,656 | France | Oct. 4, 1915 |